United States Patent
Schaller et al.

[11] Patent Number: 6,065,363
[45] Date of Patent: May 23, 2000

[54] ELECTROMECHANICAL SHIFT DEVICE FOR A CHANGE-SPEED GEARBOX OF A MOTOR VEHICLE

[75] Inventors: Gerhard Schaller, Koeln-Loevenich; Harald Hofmann, Cologne, both of Germany

[73] Assignee: Ford Global Technologies, Inc., Dearborn, Mich.

[21] Appl. No.: 08/888,545

[22] Filed: Jul. 7, 1997

[30] Foreign Application Priority Data

Jul. 16, 1996 [DE] Germany ............ 196 28 642

[51] Int. Cl.⁷ .................................. F16H 61/32
[52] U.S. Cl. .................. 74/473.12; 74/335; 74/526
[58] Field of Search ............. 74/473.12, 473.11, 74/526, 335; 192/3.61, 3.62

[56] References Cited

U.S. PATENT DOCUMENTS

| | | | |
|---|---|---|---|
| 4,567,969 | 2/1986 | Makita | 74/335 |
| 4,601,369 | 7/1986 | Hattori et al. | 74/473.12 |
| 4,821,590 | 4/1989 | Tury et al. | 74/335 |
| 4,911,031 | 3/1990 | Yoshimura et al. | 74/335 |
| 5,281,902 | 1/1994 | Edelen et al. | 74/335 |
| 5,471,893 | 12/1995 | Newbigging | 74/335 |

FOREIGN PATENT DOCUMENTS 1 139 758  11/1962  Germany.
3331223 C2  12/1986  Germany.

OTHER PUBLICATIONS

Website: Lucas Variety Catalog—Ledex® Soft Shift®Solenoids, pp. E1–E10 and J1–3 "Variable Position Actuation vs. On/Off Movement".

*Primary Examiner*—David A. Bucci
*Assistant Examiner*—William C. Joyce
*Attorney, Agent, or Firm*—Frank G. McKenzie

[57] ABSTRACT

A change-speed gearbox of a motor vehicle includes a shifting element moveable within a plurality of shift gates for engaging and disengaging a selected gear. A gearshift member cooperates with the gear shifting element. The gearshift member is movable to perform a rotary shift movement and a linear shift movement. A shift device for the gearbox includes a motor having a shaft extending therefrom rotatable about an axis. The gearshift member is axially slidably supported by the motor shaft and rotatably engaged therewith. A solenoid is engaged with the gearshift member for slidably axially moving the gearshift member into a plurality of positions corresponding with the shift gates.

10 Claims, 2 Drawing Sheets

ELECTROMECHANICAL SHIFT DEVICE FOR A CHANGE-SPEED GEARBOX OF A MOTOR VEHICLE

FIELD OF THE INVENTION

The invention relates to an electromechanical shift device for a change-speed gearbox of a motor vehicle having a gearshift member which cooperates with the gear shifting element of the change-speed gearbox and is movable to perform shifting movements substantially transverse to one another.

BACKGROUND OF THE INVENTION

German Auslegeschrift 1 139 758 ('758) discloses an electromechanical shift device for change-speed gearboxes of motor vehicles wherein a gearshift member cooperating with the gear shifting element of the change-speed gearbox is movable in two shifting movements substantially transverse to one another. A rotary movement is produced by a solenoid and a linear movement is produced by an electric motor. The motor controllably moves an actuating shaft carrying an axially movable selector sleeve. The '758 shift device has the disadvantage that the radial movement, which determines the shift gates, starting from a neutral position, can only serve two further shift gates, so that at most a shift device with three shift gates can be obtained.

German specification 33 31 223 ('223) also discloses an electromechanical shift device for change-speed gearboxes of motor vehicles. The '223 specification discloses an electromechanical shift device in the form of a complicated gear mechanism comprising a worm gear unit and a rack and pinion gear unit. In the device of the '223 specification, a linear preselection movement can be applied to a gearshift member, the engagement movement is then effected by manual actuation of the manual gear lever of the change-speed gearbox. The electromechanical shift device of the '223 specification is only semiautomatic and is quite expensive to build because of this gear mechanism.

It would be desirable to provide an inexpensive electromechanical shift device of the kind referred to having the usual three gates, and which, at little additional cost, can also serve for more than three gates.

SUMMARY OF THE INVENTION

It is therefore an object to provide an inexpensive electromechanical shift device for change-speed gearboxes which can serve for more than three gates.

Accordingly, a shift device according to the present invention comprises a gearshift member cooperating with the gear shifting element of the change-speed gearbox and is movable to perform shift movements "L" and "R" substantially transverse to one another. A linear movement "L" of said member is produced by a solenoid and a rotary movement "R" thereof is produced by means of an electric motor. The motor controllably turns an actuating shaft carrying on it an axially movable sliding sleeve. Through a splined connection, the actuating shaft carries non-rotatably but axially movably thereon a sliding sleeve. The sliding sleeve is engaged through a fork by a preselector member. The fork is actuated by means of a solenoid, which positions the sliding sleeve in different axial positions which correspond to the selected shift gates (⅚, ¾, ½ and R (reverse)).

An electromechanically actuated stop element is provided to position the preselector member in a position corresponding to the shift gates to be selected. The device can thereby serve more than three gates. In a preferred embodiment, the electromagnetic stop element is preferably located on a turntable formed as a reversing lever. In an alternative embodiment, the stop element is integrated within the magnet. The present invention therefore has the advantages of being inexpensive and having the capacity to provide three or more shift gates, thereby enabling a transmission with six forward gears and reverse.

BRIEF DESCRIPTION OF THE DRAWING

The invention will now be described in more detail, by way of example, with reference to the accompanying drawing, in which.

DETAILED DESCRIPTION OF A PREFERRED EMBODIMENT

Figure 1:
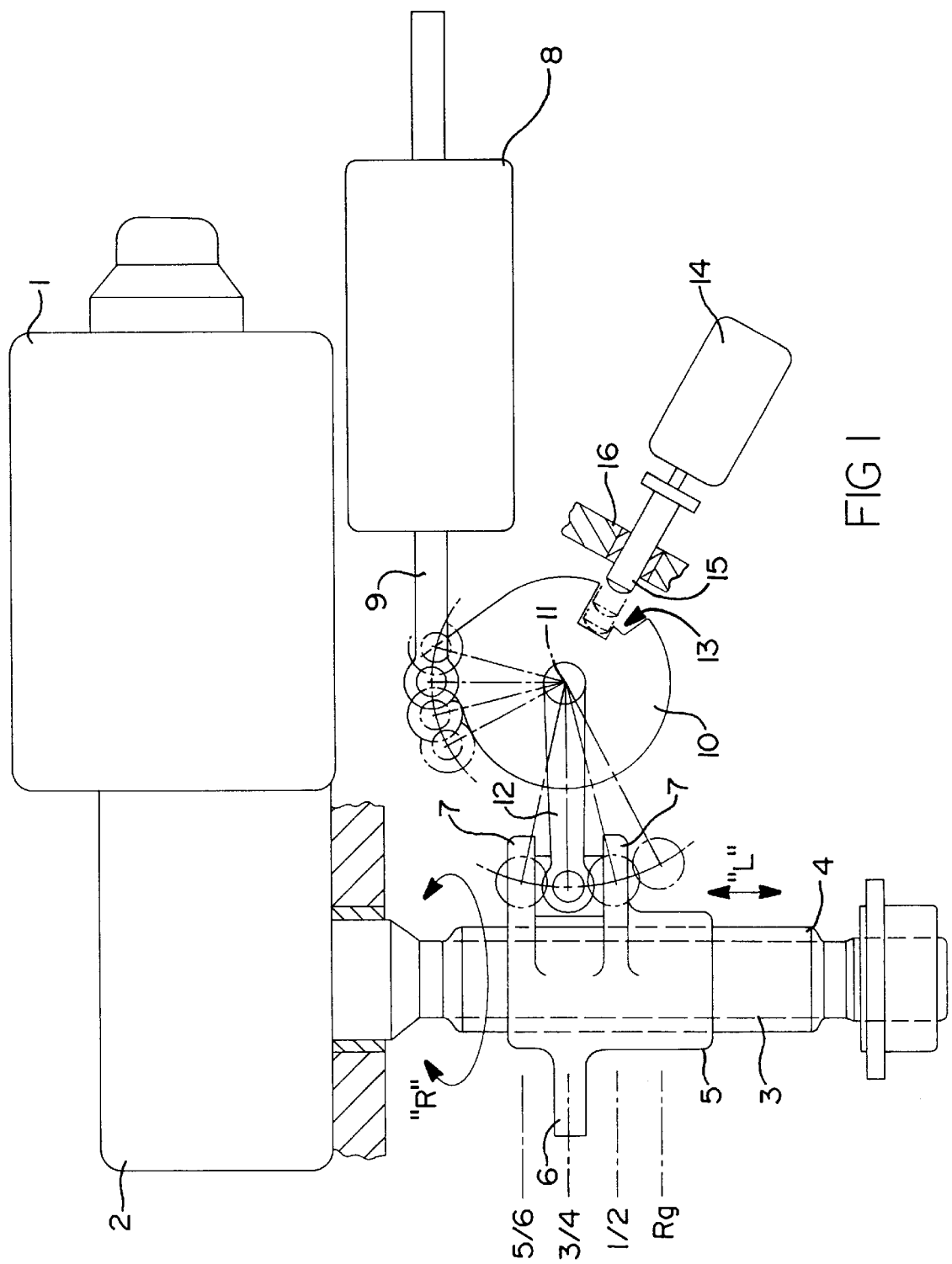
FIG. 1 shows a diagrammatic view of an electromagnetic shift device in accordance with the invention.

An electromagnetic shift device for a change-speed gearbox of a motor vehicle consists essentially of an electric motor 1 which controllably turns an actuating shaft 3 through reduction gearing 2. The actuating shaft 3 is provided with splines 4 and carries non-rotatably an axially displaceable selector sleeve 5 which is provided on one side with a shift finger 6 and on the other side with a fork 7 to receive an actuating element for axial displacement. An actuating element for axial displacement preferably consists of a solenoid 8, the core (not shown) of which is connected to an actuating rod 9 which can directly engage the fork 7.

In a preferred embodiment, a reversing lever 10 in the form of a disc is carried on a pivot axle 11 and engages the fork 7 with a lever arm 12. The reversing lever in the form of a disc 10 is provided at its circumference with a step-shaped recess 13 which cooperates with a stop pin 15 which can be displaced by means of a solenoid 14. The stop pin 15 can be further supported in a guide 16.

The manner of operation of the electromechanical shift device in accordance with the invention will now be described.

The sliding sleeve 5 is freely movable on the actuating shaft 3 in the axial direction and is moved upwards or downwards into the desired gates by the solenoid 8 which cooperates with the fork 7. The gates are indicated on the left hand side of the shift finger 6 as ⅚, ¾, ½ and R (reverse) and correspond to the usual gear ratios of a motor vehicle.

The rotary motion of the electric motor 1 is transmitted by the splines 4 to the sliding sleeve 5 in order, for a selected shift gate, to effect the corresponding engagement movement to shift the respective gear ratio.

In the ¾ gate the stop pin 15 engages the reversing lever 10 in the inner region of the recess 13, and in the ½ gate in the outer region of the recess.

The positions of the ⅚ and R gates are fixed by the internal stops of the solenoid 8.

The process of shifting from the R gate to the ½ gate is not critical with respect to time. Coming from the shift position R, the reversing lever 10 is pivoted as far as the stop in the ¾ gate with the stop pin 15 pushed halfway in. The stop pin 15 then remains in the same position and the reversing lever 10 is turned back until it reaches the position of the ½ gate.

The electromechanical shift device in accordance with the invention has the advantage that for automated shift devices the learning process that would otherwise be necessary for learning the preselection positions is omitted, since in the present case these are fixed mechanically by the stop pin 15. Determination of the selection positions by sensors is no longer necessary, and the robustness of the system is thereby considerably increased. The learning of the respective shift end positions to be adjusted to is simplified, in that the running up against the shift stop enables this to be detected by monitoring the motor current.

Figure 2:
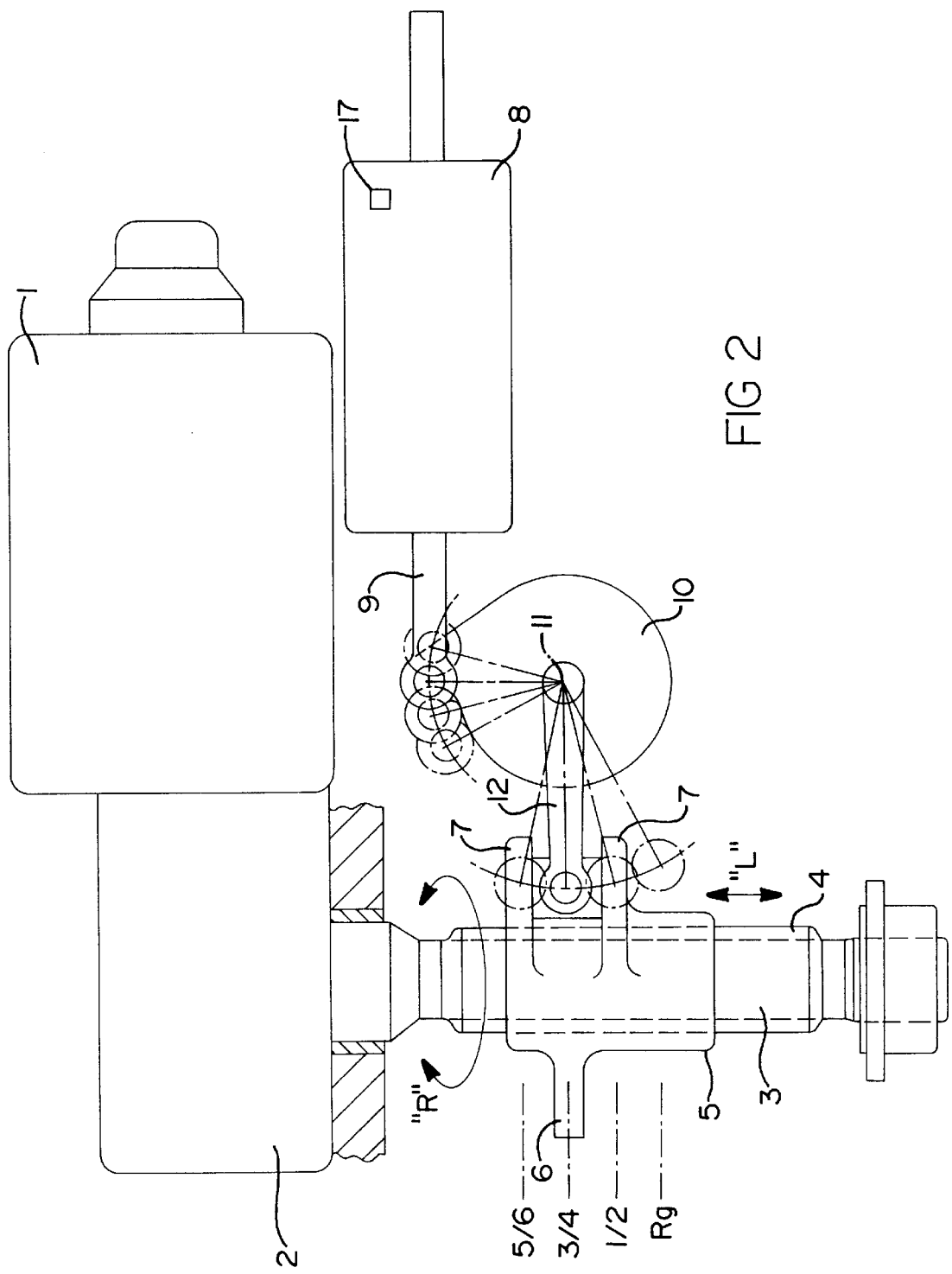
FIG. 2 shows a diagrammatic view of an alternative embodiment of an electromagnetic shift device in accordance with the invention.

In an alternative embodiment illustrated in FIG. 2, a stop 17 can be integrated into the solenoid 8 to replace the stop pin 15 illustrated in FIG. 1.

Furthermore a definite adjustment of the shift force is readily possible by means of the motor current control unit. By the integration of the control electronics on the actuator, i.e., on the electric motor or on the solenoid itself, little demand is made on external control devices.

What is claimed is:

1. An electromechanical shift device for a change-speed gearbox of a motor vehicle, the gearbox including a shifting element moveable within a plurality of shift gates for engaging and disengaging a selected gear, and a gearshift member cooperating with the gear shifting element, the gearshift member movable to perform a rotary shift movement and a linear shift movement, the shift device comprising:
   a motor having a shaft extending therefrom controllably rotatable about an axis to engage and disengage a gear;
   said gearshift member comprises a sleeve axially slidably supported by the motor shaft through a splined connection and rotatably engaged therewith;
   a first solenoid operatively engaged with said gearshift member for slidably axially moving said gearshift member into a plurality of positions corresponding with the shift gate;
   a shift fork actuated by the first solenoid through a disk member and engaged with the sleeve to slidably move the sleeve into a position corresponding with a selected one of the shift gates;
   preselector means for selecting a position of the gearshift member corresponding to one of the shift gates prior to actuating the first solenoid; and
   a lever arm actuated by the disc and engaged with the shift fork for moving the sleeve to the position corresponding with the selected one of the shift gates upon rotation of the disc to a position corresponding with the one of the shift gates.

2. A shift device according to claim 1, further comprising an electromechanically actuated stop element to position the disc member in the position corresponding with the one of the shift gates.

3. A shift device according to claim 2, wherein the stop element comprises:
   the disc member having an outer periphery with a step-shaped recess formed therein;
   a second solenoid positioned adjacent the disc;
   a stop pin actuated by the second solenoid for engaging the disc recess to selectably prevent rotation thereof.

4. A shift device according to claim 1, wherein the disk member comprises a reversing lever.

5. A shift device according to claim 4, further comprising an electromechanically actuated stop element to position the disk member in a position corresponding with one of the shift gates.

6. A shift device according to claim 5, wherein the stop element comprises a stop pin actuated by a second solenoid.

7. An electromechanical shift device for a change-speed gearbox of a motor vehicle, the gearbox including a shifting element moveable within a plurality of shift gates for engaging and disengaging a selected gear, and a gearshift member cooperating with the gear shifting element, the gearshift member movable to perform a rotary shift movement and a linear shift movement, the shift device comprising:
   a motor having a shaft extending therefrom controllably rotatable about an axis to engage and disengage a gear;
   said gearshift member comprising a sleeve axially slidably supported by the motor shaft through a splined connection and rotatably engaged therewith;
   a first solenoid operatively engaged with said gearshift member for slidably axially moving said gearshift member into a plurality of positions corresponding with the shift gates;
   an electromechanically actuated stop element to position a preselector member in a position corresponding with one of the shift gates, the stop element comprising a stop pin actuated by a second solenoid; and
   a shift fork actuated by the first solenoid through the preselector member and engaged with the sleeve to slidably move the sleeve into a position corresponding with the selected one of the shift gates, the preselector member comprising a two-armed reversing lever, the two-armed reversing lever including a rotary disc having a periphery with a recess formed therein; and the stop pin actuated by the second solenoid for engaging the disc recess for positioning the disc in a position corresponding with the one of the shift gates.

8. An electromechanical shift device for a change-speed gearbox of a motor vehicle, the gearbox including a shifting element moveable within a plurality of shift gates for engaging and disengaging a selected gear, and a gearshift member cooperating with the gear shifting element, the gearshift member movable to perform a rotary shift movement and a linear shift movement, the shift device comprising:
   a motor having a shaft extending therefrom rotatable about an axis;
   said gearshift member comprising a sleeve axially slidably supported by the motor shaft through a splined connection and rotatably engaged therewith for engaging and disengaging a gear; and
   a disk actuated by a solenoid, the disk operatively engaging said gearshift member for slidably axially moving said gearshift member into a plurality of positions corresponding with the shift gates;
   preselector means for selecting a position of the gearshift member corresponding to one of the shift gates prior to actuating the solenoid; and
   a lever arm actuated by the disc and engaged with the sleeve for moving the sleeve to a position corresponding with one of the shift gates upon rotation of the disc to one of the plurality of positions corresponding with the one of the shift gates.

9. A shift device according to claim 8, further comprising an electromechanically actuated stop element to position the disc in the position corresponding with the one of the shift gates.

10. A shift device according to claim 9, wherein the stop element comprises:
   the disc having an outer periphery with a step-shaped recess formed therein;
   a second solenoid positioned adjacent the disc;
   a stop pin actuated by the second solenoid for engaging the disc recess to selectably prevent rotation thereof.

* * * * *